Aug. 17, 1954  H. A. HOSEY  2,686,346
CUFF CLIP
Filed June 26, 1950
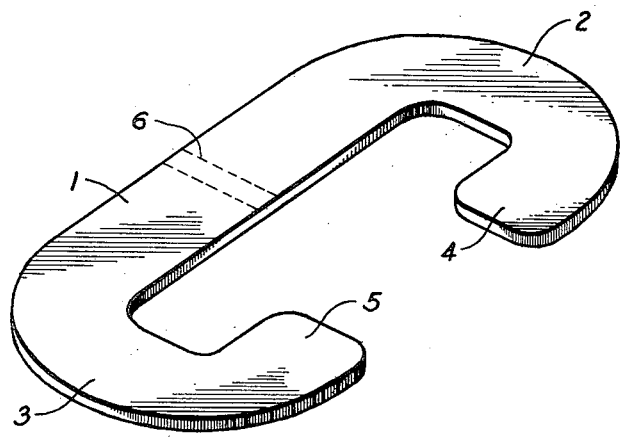
Fig. 1.
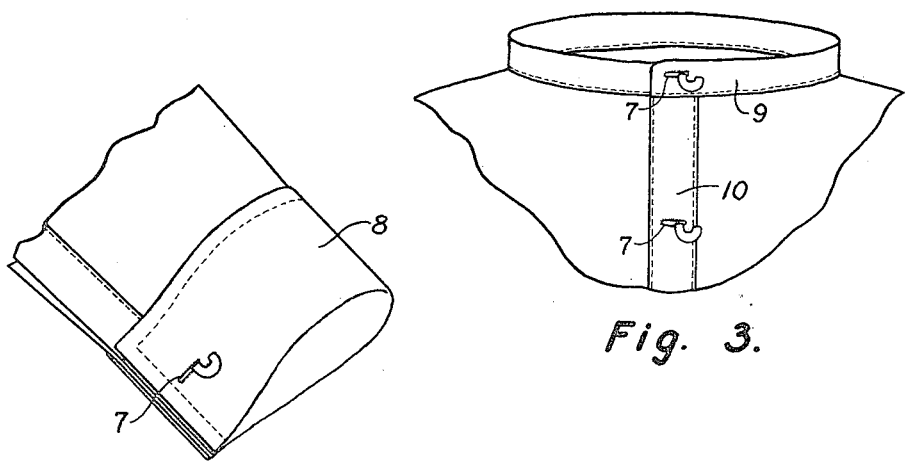
Fig. 2.
Fig. 3.
Inventor
Harry A. Hosey.
By
Lamont Johnston.
ATTORNEY Patented Aug. 17, 1954

2,686,346

UNITED STATES PATENT OFFICE 2,686,346

CUFF CLIP

Harry A. Hosey, Old Hickory, Tenn.

Application June 26, 1950, Serial No. 170,383

1 Claim. (Cl. 24—102)

My invention relates to a garment fastener and more particularly to a bendable fastener suited for use by laundries in fastening neckbands and French cuffs of shirts.

Various types of fasteners are now used by laundries with French cuffs, but none of these are sufficiently satisfactory. All such fasteners have the common failing of slipping out of the cuffs or neckbands.

One object of my invention is to provide a cuff or neckband fastener so designed as to prevent it from slipping out of the buttonhole.

Another object is to provide a fastener of permanently C-shaped material which may be inserted through a buttonhole and pushed to one end of the buttonhole in a position such that the hooked ends of the fastener engaged the cloth adjacent to the buttonhole to prevent its unintentional removal therefrom.

The foregoing and other objects, features and advantages of this invention will be apparent from the following description and from the accompanying drawings of a preferred embodiment, it being understood that the detailed description and drawings are merely illustrative of the invention, which is defined in the claim.

In the drawings,

Figure 1 is an enlarged perspective view of a fastener made in accordance with my invention and illustrating clearly its shape.

Figure 2 is a view showing the use of a fastener made in accordance with my invention in a French cuff.

Figure 3 illustrates the use of such a fastener in the neckband and in one of the front buttonholes of a shirt.

Like reference numerals refer to like parts throughout the several figures of the drawings.

According to my invention, a C-shaped strip of thin permanently deformable material is provided. This material may be sheet aluminum, sheet steel, or any other ductile metal, or it may be a plastic material. The piece of metal or other material comprises a main body portion 1 and opposing hooked end portions 2 and 3, the latter terminating in rounded points 4 and 5. The fastener preferably has all its exterior corners formed in smooth curves which are arcs of circles and its sides are straight, so that it will have no projecting, sharp points which can catch in and damage fabric. Also, its interior corners are rounded off slightly to prevent catching of fabric in them.

If desired, the center of the main body portion may be slightly scored or crimped, as illustrated in dotted lines at 6, in order to facilitate bending of the fastener in its middle. The fastener may be easily and inexpensively manufactured in large quantities by stamping it from sheet metal, the die used for the stamping having a ridged portion to form the score line 6.

In the use of the fastener as illustrated in Figures 2 and 3, the fastener is pushed or inserted through the buttonhole 7 of a cuff 8, a neckband 9 or a shirt front 10. It is then pushed to the end or corner of the buttonhole which is adjacent the open sides of the C-shaped fastener, so that the points 4 and 5 of the hooked ends 2 and 3 of the fastener extend beyond the end of the buttonhole. The fastener is then bent in its middle to form two substantially parallel portions.

These two parallel portions prevent the parts of the cuff or neckband from moving away from each other in a direction normal to their surfaces. Also, when the parts of the cuff or neckband tend to move away from each other in a direction parallel to their surfaces, the fasteners cannot come out of the buttonhole because one of its hooked ends 4 and 5 is restrained from moving out of the buttonhole by the cloth of the shirt, with which it comes into contact. This positively prevents the fastener from slipping out of the buttonhole and thus avoids the fault inherent in buttonhole fasteners at present on the market.

I claim:

A fastener comprising a thin flat C-shaped piece of bendable metal having ends extending toward each other to form hooked portions at each end, the ends being joined by lateral extensions and by an elongated center section spaced from the ends a distance at least as great as the width of the center section.

References Cited in the file of this patent

UNITED STATES PATENTS

| Number | Name | Date |
|---|---|---|
| 1,254,055 | Mitchell | Jan. 22, 1918 |
| 1,258,449 | Pejchar | Mar. 5, 1918 |
| 1,426,571 | Kohl | Aug. 22, 1922 |
| 1,547,681 | Possner | July 28, 1925 |
| 1,577,138 | Mays | Mar. 16, 1926 |
| 2,529,308 | Powers | Nov. 7, 1950 |